United States Patent
Sugimori et al.

(10) Patent No.: US 8,381,001 B2
(45) Date of Patent: Feb. 19, 2013

(54) COMMAND PROCESSING APPARATUS WHICH EXECUTES A PROCESS ACCORDING TO A COMMAND ISSUED BY AN EXTERNAL DEVICE

(75) Inventors: Masaaki Sugimori, Hirakata (JP); Shiro Nakamura, Shijonawate (JP); Masashi Hatano, Seki (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 372 days.

(21) Appl. No.: 12/727,351

(22) Filed: Mar. 19, 2010

(65) Prior Publication Data
US 2010/0250979 A1 Sep. 30, 2010

(30) Foreign Application Priority Data
Mar. 25, 2009 (JP) ................................ 2009-074002

(51) Int. Cl.
*G06F 1/00* (2006.01)
*G06F 1/32* (2006.01)
(52) U.S. Cl. .......................... 713/310; 713/300; 713/324
(58) Field of Classification Search .................... 713/310
See application file for complete search history.

(56) References Cited

U.S. PATENT DOCUMENTS

| 6,067,116 | A | * | 5/2000 | Yamano et al. | ............... 348/372 |
| 7,293,187 | B2 | * | 11/2007 | Ono | .............................. 713/324 |
| 7,461,277 | B2 | * | 12/2008 | Kawakami et al. | ........... 713/310 |
| 7,969,464 | B2 | * | 6/2011 | Uchida | ............................ 348/79 |
| 8,100,333 | B2 | * | 1/2012 | Reynolds et al. | ............. 235/487 |
| 2008/0180551 | A1 | * | 7/2008 | Koike | ....................... 348/231.99 |

FOREIGN PATENT DOCUMENTS
JP 2008187536 8/2008

* cited by examiner

*Primary Examiner* — Suresh Suryawanshi
(74) *Attorney, Agent, or Firm* — Novak Druce Connolly Bove + Quigg, LLP

(57) ABSTRACT

A digital camera is provided with: a sub CPU started irrespective of a state of an SW group; and a main CPU and an HDMI-CPU which are started when the SW group is in an on state while stopped when the SW group is in an off state. The sub CPU repeatedly determines whether or not a wake-up command is issued from a digital television connected via an HDMI cable when the SW group is in the off state. Furthermore, the sub CPU changes the state of the SW group to the on state when a determination result relating to presence or absence of the wake-up command is updated from NO to YES. The HDMI-CPU and the main CPU that are started thereby execute a process according to a command issued from the digital television.

10 Claims, 10 Drawing Sheets

(A) MAIN POWER SOURCE: OFF STATE (B) MAIN POWER SOURCE: ON STATE

COMMAND PROCESSING APPARATUS WHICH EXECUTES A PROCESS ACCORDING TO A COMMAND ISSUED BY AN EXTERNAL DEVICE

CROSS REFERENCE OF RELATED APPLICATION

The disclosure of Japanese Patent Application No. 2009-74002, which was filed on Mar. 25, 2009, is incorporated herein by reference.

BACKGROUND OF THE INVENTION

1. Field of the Invention

The present invention relates to a command processing apparatus. More particularly, the present invention relates to a command processing apparatus which executes a process according to a command issued by an external device.

2. Description of the Related Art

According to one example of this type of apparatus, a command transmitted from a digital television is received by an HDMI-command processing portion of a digital video camera. If the received command is an image-transfer request command, an HDMI output processing portion is started by a CPU. Still image data accumulated in a memory of the digital video camera is transferred to the digital television by the HDMI output processing portion. The HDMI output processing portion is stopped by a CPU after completion of transferring the still image data. As a result of starting/stopping of such an HDMI output processing portion, power consumption is decreased.

However, the HDMI-command processing portion is started even in a low power consumption mode. Thus, in the above-described apparatus, there is a limit on the decrease in power consumption.

SUMMARY OF THE INVENTION

A command processing apparatus according to the present invention is a command processing apparatus according to the present invention provided with: a first processor started irrespective of a state of a main power source; and a second processor started when the main power source is in an on state while stopped when the main power source is in an off state, in which the first processor is provided with a first determiner which repeatedly determines whether or not a start command is issued by an external device when the main power source is in the off state, and a first changer which changes the state of the main power source to the on state when a determination result of the first determiner is updated from a negative result to a positive result, and the second processor is provided with a command processor which executes a process according to a command issued by the external device.

Preferably, the first determiner includes a first decoder which decodes data transmitted from the external device in the off state according to a predetermined format, and a first command determiner which determines whether or not the data decoded by the first decoder is equivalent to the start command.

Preferably, the command processor includes a second determiner which determines whether or not the command is issued by the external device, and a command process executer which executes a process according to the command when a determination result of the second determiner is updated from a negative result to a positive result.

In a certain aspect, the second determiner includes a second decoder which decodes data transmitted from the external device according to the predetermined format, and a second command determiner which determines whether or not the data decoded by the second decoder is equivalent to the command.

In other aspect, the second processor is separated into a first CPU which assumes a role of the second determiner and a second CPU which assumes a role of the command process executer, and the first CPU is arranged in a main-body apparatus while the second CPU is arranged in a cradle.

In another aspect, the command processor includes an issuer which issues a power-source off instruction toward the first processor when the command is a stop command, and the first processor is further provided with a second changer which changes the state of the main power source to the off state in response to the power-source off instruction issued by the issuer.

Preferably, the first processor further includes a third changer which changes the state of the main power source to the on state in response to the power-source on manipulation, and a fourth changer which changes the state of the main power source to the off state in response to the power-source off manipulation.

Preferably, further comprised is a manipulation key, and the first processor is further provided with a transferer which transfers state information indicating a state of the manipulation key to the second processor when the main power source is in the on state, and the second processor is further provided with a key processor which executes a process according to the state information transferred by the transferer.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
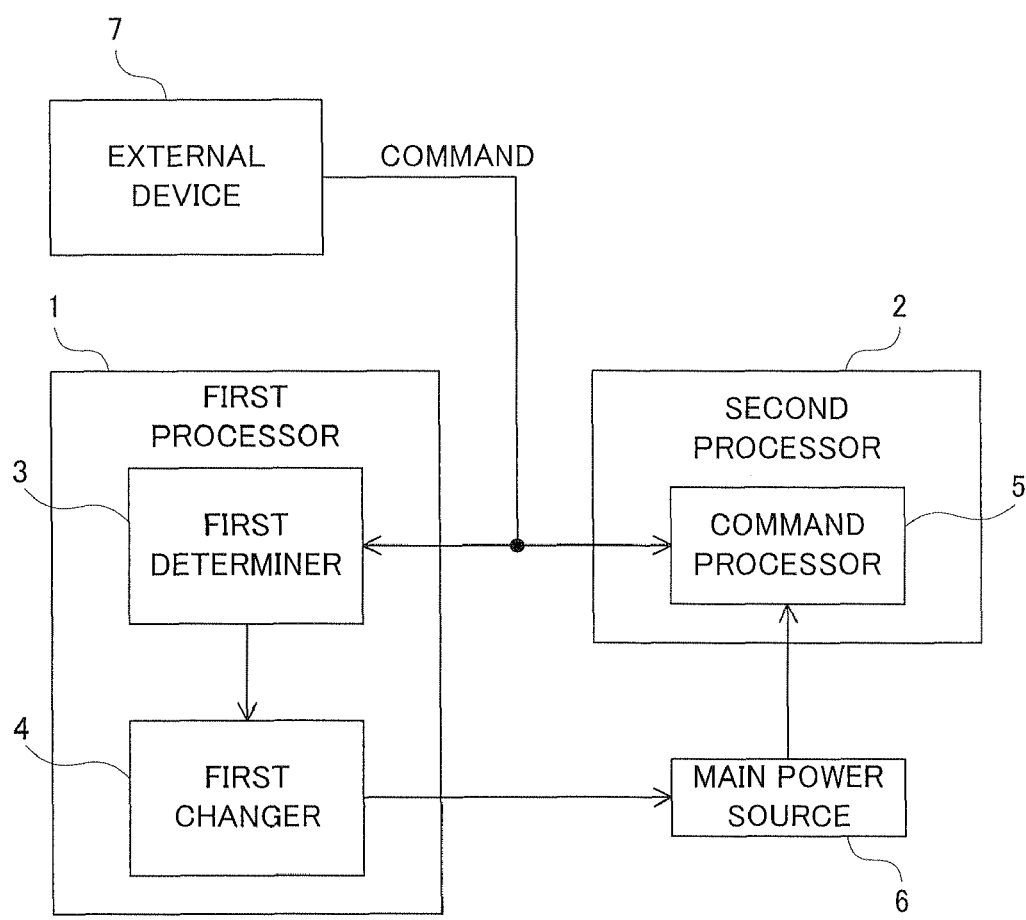
FIG. 1 is a block diagram showing a fundamental configuration of the present invention.

With reference to FIG. 1, a command processing apparatus of the present invention is provided with a first processor 1 started irrespective of a state of a main power source 6 and a second processor 2 started when the main power source 6 is in an on state while stopped when the main power source 6 is in an off state. Furthermore, the first processor 1 is provided with a first determiner 3 and a first changer 4, and the second processor 2 is provided with a command processor 5.

The first determiner 3 repeatedly determines whether or not a start command is issued by an external device 7 when the main power source 6 is in an off state. The first changer 4 changes a state of the main power source 6 to an on state when a determination result of the first determiner 3 is updated from a negative result to a positive result. The command processor 5 executes a process according to the command issued by the external device 7.

Therefore, when the second processor 2 is in a stop state, whether or not the start command is issued by the external device 7 is determined by the first processor 1. The second processor 2 is started by the first processor 1 when a determination result becomes positive. A process according to the command issued thereafter by the external device 7 is executed by the second processor 2.

In this way, the process according to the start command is executed by the first processor 1, and the process according to the command issued after the start command is executed by the second processor 2. Thereby, particularly, it becomes possible to alleviate the power consumption of the second processor 2 during the low power consumption mode, for example. As a result, a capability to save power is improved.

Figure 2:
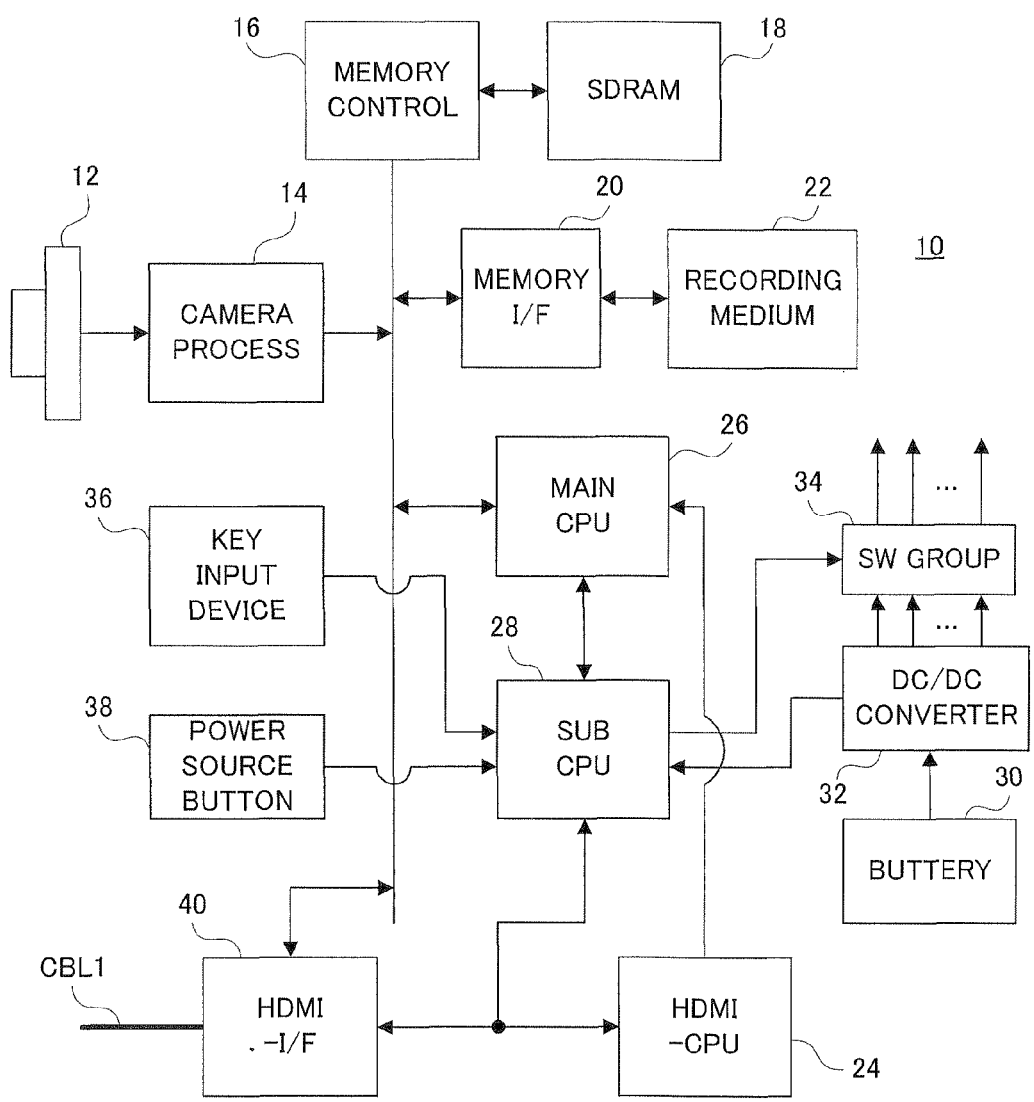
FIG. 2 is a block diagram showing a configuration of one embodiment of the present invention.

With reference to FIG. 2, a digital camera 10 in this embodiment includes a battery 30 connected to a DC/DC converter 32. The DC/DC converter 32 produces a plurality of direct-current voltages respectively having a plurality of voltage values, based on a battery voltage, and supplies one of the plurality of produced direct-current voltages to a sub CPU 28 while supplies the rest of the direct-current voltages to a SW group 34.

In response to a power-source on manipulation toward a power source button 38, the sub CPU 28 turns on the SW group 34, and in response to a power-source off manipulation toward the power source button 38, the sub CPU 28 turns off the SW group 34. The plurality of direct-current voltages supplied to the SW group 34 are applied to the whole system except for the sub CPU 28 when the SW group 34 is turned on.

It is noted that in this embodiment, a state where the SW group 34 is turned on is defined as a "main-power-source on state", and a state where the SW group 34 is turned off is defined as a "main-power-source off state".

In the main-power-source on state, the sub CPU 28 repeatedly senses a manipulation state of a key input device 36, and transfers key state information indicating the sensed manipulation state to a main CPU 26. The main CPU 26 refers to the transferred key state information so as to recognize the manipulation state of the key input device 36.

When an imaging manipulation is performed on the key input device 36, the main CPU 26 applies corresponding commands to an imaging device 12 and a memory I/F 20 in order to execute an imaging process. The imaging device 12 outputs 1 frame of image data representing an object scene. The outputted image data is subjected to a predetermined process by a camera processing circuit 14, and the processed image data is written into an SDRAM 18 by a memory control circuit 16. The memory I/F 20 reads out the image data accommodated in the SDRAM 18 through the memory control circuit 16, and records the read-out image data into a recording medium 22 in a file format.

An HDMI-I/F 40 is an I/F that is adapted to an HDMI (High-Definition Multimedia Interface) standard. A communication between the digital camera 10 and a digital television 50 shown in FIG. 3 is realized when one end of an HDMI cable CBL1 is connected to the HDMI-I/F 40 and an alternate end of the HDMI cable CBL1 is connected to an HDMI-I/F (not shown) of the digital television 50.

Figure 3:
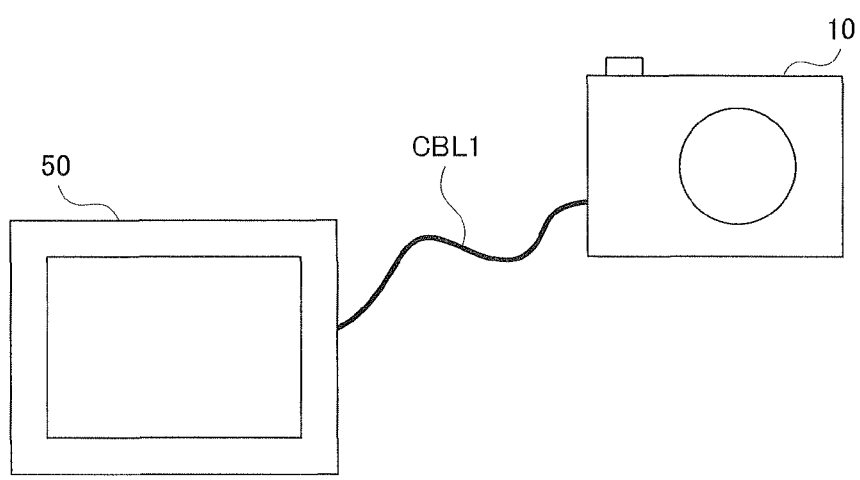
FIG. 3 is an illustrative view showing one example of a connection relation between the embodiment in FIG. 2 and a digital television.

When CEC (Consumer Electronics Control) data is transmitted from the digital television 50 in a connection state shown in FIG. 3, the CEC data is applied via the HDMI-I/F 40 to the sub CPU 28 and an HDMI-CPU 24.

Figure 4:
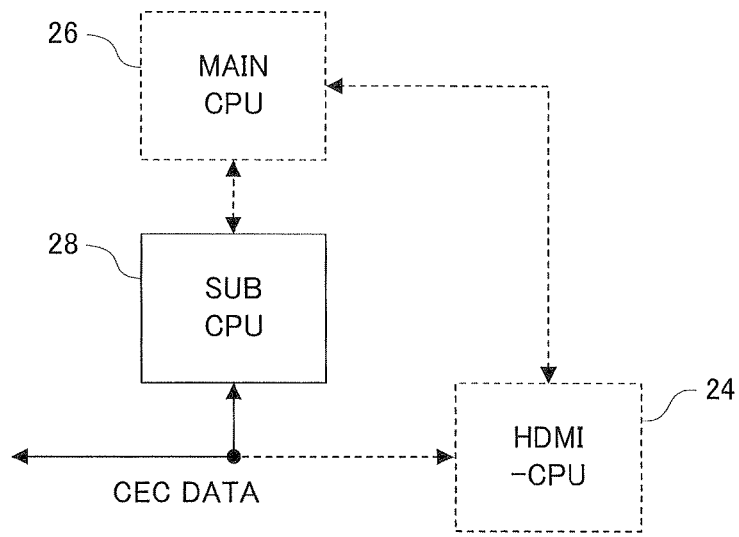
FIG. 4(A) is an illustrative view showing one portion of an operation of the embodiment in FIG. 2 when a main power source is in an off state.
FIG. 4(B) is an illustrative view showing one portion of an operation of the embodiment in FIG. 2 when the main power source is in an on state.
Figure 4:
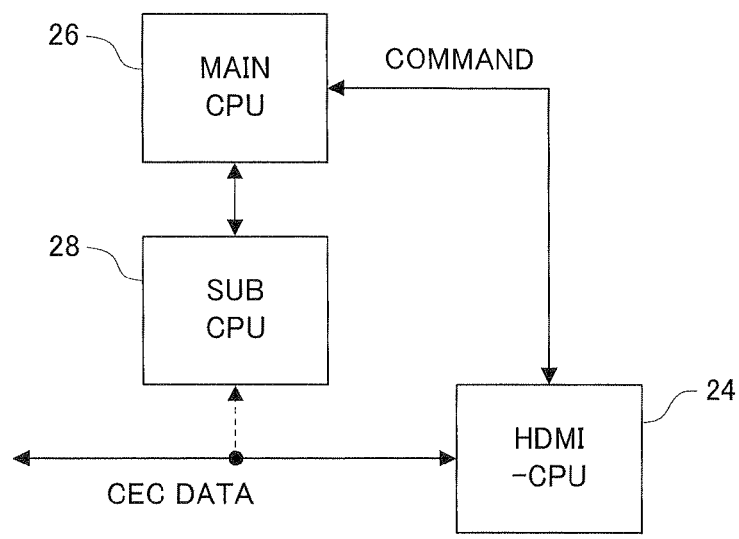

With reference to FIG. 4(A), the CEC data transmitted from the digital television 50 in the main-power-source off state is decoded by the sub CPU 24 according to a predetermined format. When the decoded data is a wake-up command (start command), the SW group 34 is turned on by the sub CPU 28. As a result, the main-power-source on state is established, and the HDMI-CPU 24 is started.

With reference to FIG. 4(B), the CEC data transmitted from the digital television 50 in the main-power-source on state is decoded by the HDMI-CPU 24 according to the predetermined format. When the decoded data is a command, the command is transferred from the HDMI-CPU 24 to the main CPU 26.

When the command transferred from the HDMI-CPU 24 is an image data input/output command, the main CPU 26 executes an image data input/output process. The image data recorded in the recording medium 22 shown in FIG. 2 is read out by the memory I/F 20 and sent out by the HDMI-I/F 40 toward the digital television 50. Furthermore, the image data sent out from the digital television 50 is received by the HDMI-I/F 40 and recorded by the memory I/F 20 into the recording medium 22.

When the command transferred from the HDMI-CPU 24 is a sleep command (stop command), the main CPU 26 issues a power-source off instruction toward the sub CPU 28. The sub CPU 28 turns off the SW group 34 in response to the power-source off instruction issued from the main CPU 26.

Figure 5:
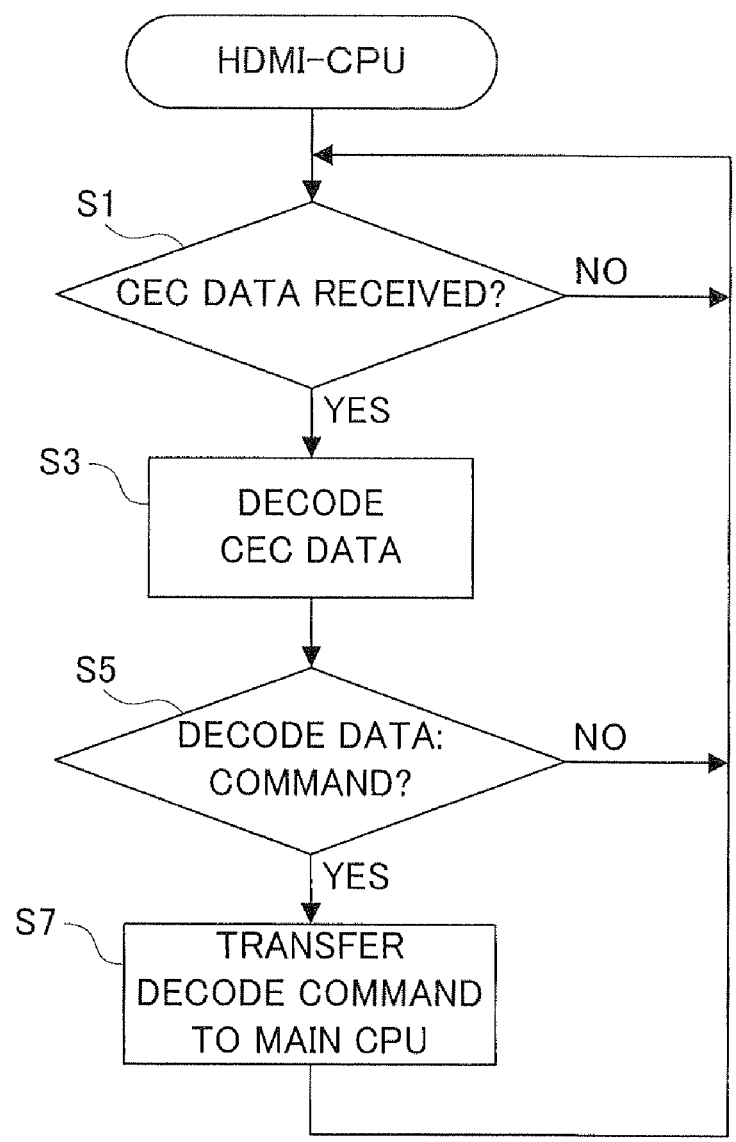
FIG. 5 is a flowchart showing one portion of an operation of an HDMI-CPU applied to the embodiment in FIG. 2.
Figure 6:
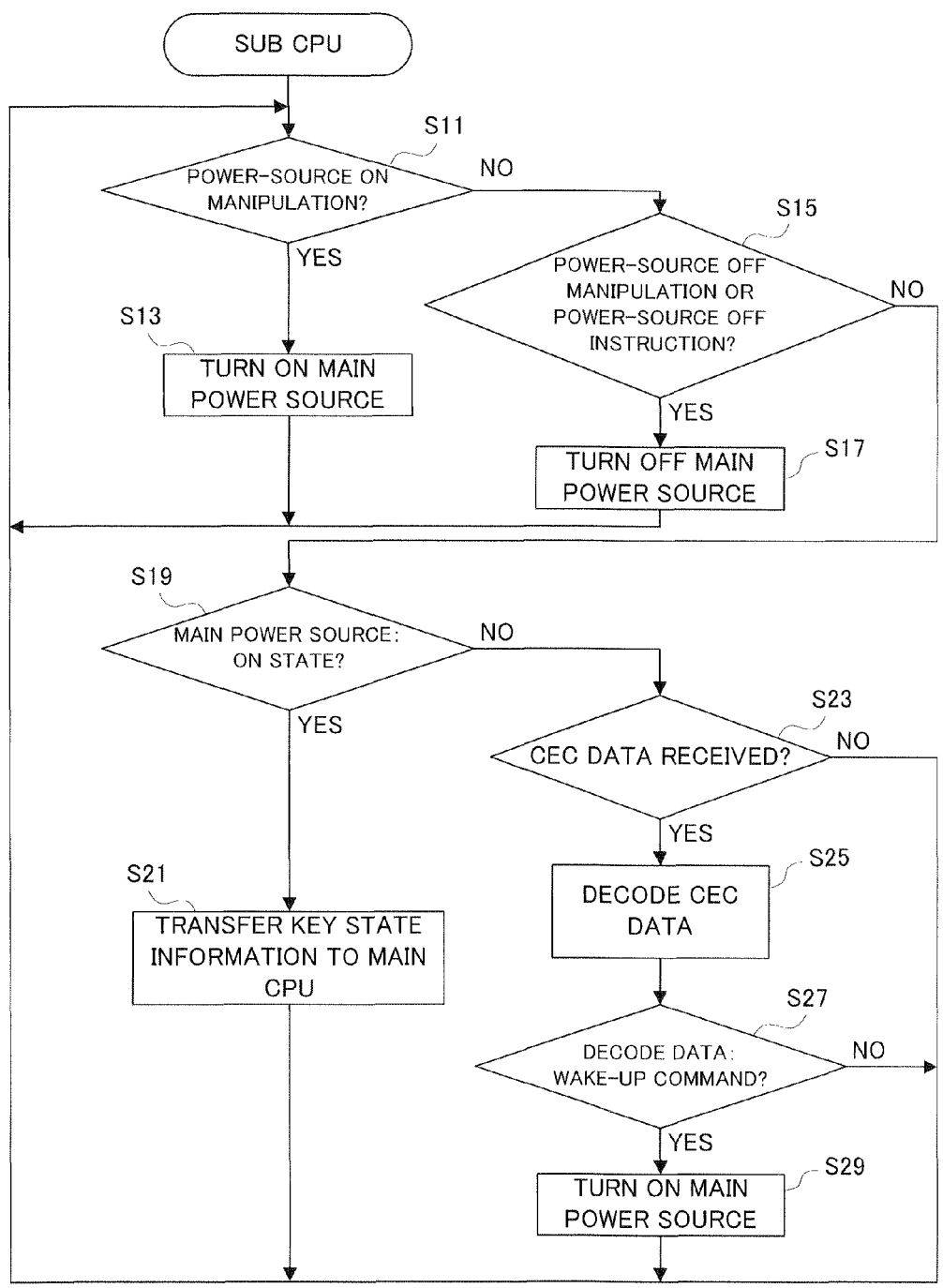
FIG. 6 is a flowchart showing one portion of an operation of a sub CPU applied to the embodiment in FIG. 2.
Figure 7:
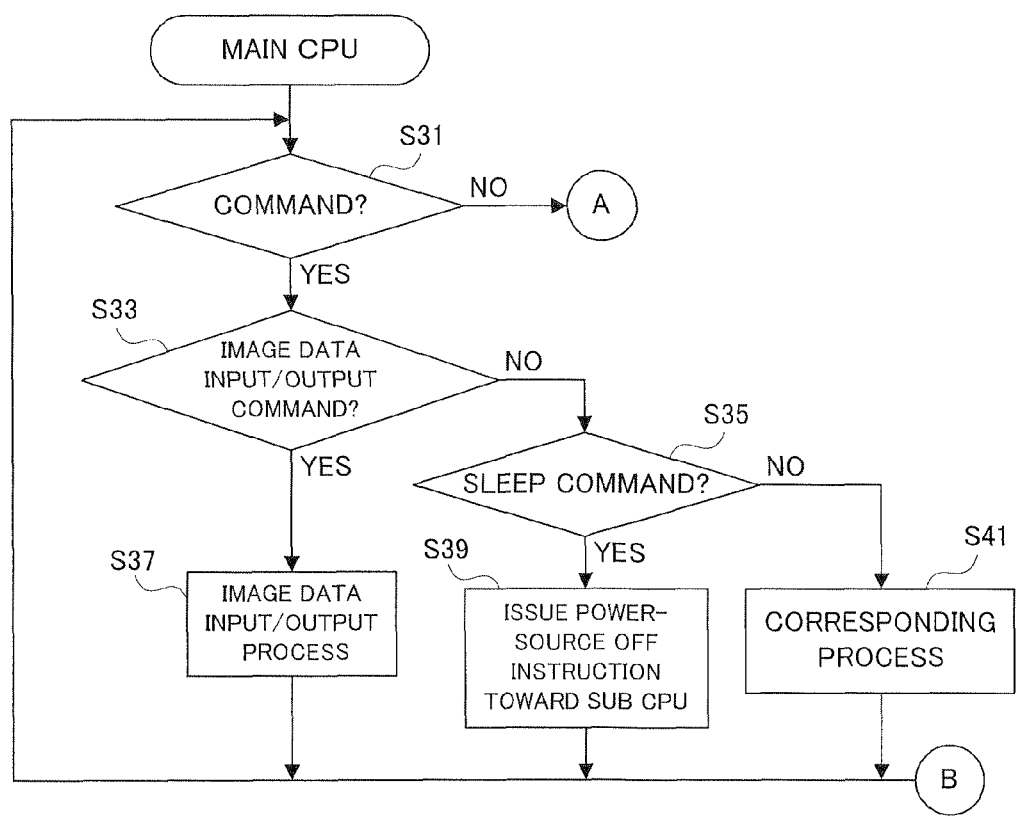
FIG. 7 is a flowchart showing one portion of an operation of a main CPU applied to the embodiment in FIG. 2.
Figure 8:
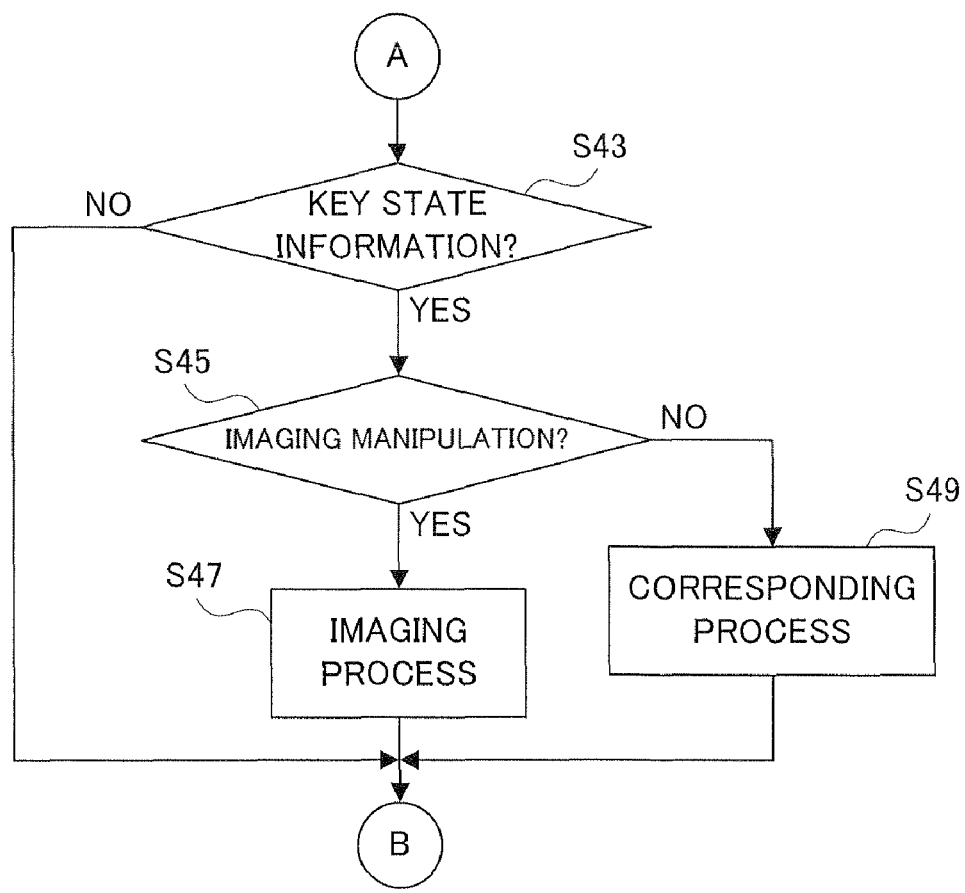
FIG. 8 is a flowchart showing another portion of the operation of the main CPU applied to the embodiment in FIG. 2.

The HDMI-CPU 24 executes a process according to a flowchart shown in FIG. 5, the sub CPU 28 executes a process according to a flowchart shown in FIG. 6, and the main CPU 26 executes a process according to flowcharts shown in FIG. 7 and FIG. 8.

With reference to FIG. 5, in a step S1, it is determined whether or not the CEC data is received. When a determination result is updated from NO to YES, the process advances to a step S3 to decode the received CEC data. In a step S5, it is determined whether or not the decoded data is equivalent to a command, and when a determination result is NO, the process directly returns to the step S1 while when the determination result is YES, the decode data, i.e., the command, is transferred to the main CPU 26 in a step S7, and then, the process returns to the step S1.

With reference to FIG. 6, in a step S11, the presence or absence of the power-source on manipulation is determined, and in a step S15, the presence or absence of the power-source off manipulation or the power-source off instruction is determined. In a step S19, it is determined whether or not the current state of the SW group 34 is the main-power-source on state, and in a step S23, it is determined whether or not the CEC data is received.

When the power-source on manipulation is performed, YES is determined in the step S11, and the SW group 34 is turned on in a step S13. Upon completion of the process in the step S13, the process returns to the step S11. When the power-source off manipulation is performed or the power-source off instruction is issued, YES is determined in the step S15, and the SW group 34 is turned off in a step S17. Upon completion of the process in the step S17, the process returns to the step S11.

When the current state of the SW group 34 is the main-power-source on state, YES is determined in the step S19, and the key state information is transferred to the main CPU 26 in a step S21. Upon completion of the process in the step S21, the process returns to the step S11.

When the current state is the main-power-source off state, NO is determined in the step S19, and when the CEC data is received, the process advances from the step S23 to a step S25 to decode the received CEC data. In a step S27, it is determined whether or not the decoded data is equivalent to the wake-up command, and when a determination result is NO, the process directly returns to the step S11 while when the determination result is YES, the process turns on the SW group 34 in a step S29, and then, returns to the step S11.

With reference to FIG. 7 and FIG. 8, in a step S31, it is determined whether or not the command is inputted from the HDMI-CPU 24, and in a step S43, it is determined whether or not the key state information is inputted from the sub CPU 28. When NO is determined in the both steps S31 and S43, the process returns to the step S31.

When YES is determined in the step S31, it is determined in a step S33 whether or not the inputted command is the image data input/output command, and it is determined in a step S35 whether or not the inputted command is the sleep command. When YES is determined in the step S33, the image data input/output process is executed in a step 537. When YES is determined in the step S35, the power-source off instruction is issued toward the sub CPU 28 in a step S39. When NO is determined in the both steps S33 and S35, the corresponding process is executed in a step S41. Upon completion of the process in the step S37, S39, or S41, the process returns to the step S31.

When YES is determined in the step S43, the process advances to a step S45 so as to determine whether or not the imaging manipulation is performed based on the transferred key state information from the sub CPU 28. When YES is determined in the step S45, the imaging process is executed in a step S47. When NO is determined in the step S45, the corresponding process is executed in a step S49. Upon completion of the process in the step S47 or S49, the process returns to the step S31.

As is seen from the above-described explanation, the digital camera 10 is provided with the sub CPU 28 started irrespective of the state of the SW group 34 and the main CPU 26 and the HDMI-CPU 24 which are started when the SW group 34 is in the on state while stopped when the SW group 34 is in the off state.

The sub CPU 26 repeatedly determines whether or not the wake-up command is issued from the digital television 50 when the SW group 34 is in the off state (S23 to S27). Furthermore, the sub CPU 26 changes the state of the SW group 34 to the on state when the determination result relating to the presence or absence of the wake-up command is updated from NO to YES (S29). The HDMI-CPU 24 and the main CPU 26 started thereby execute the process according to the command issued from the digital television 50 (S1 to S7, and S31 to S41).

Therefore, when the HDMI-CPU 24 and the main CPU 26 are in the stop state, whether or not the wake-up command is issued from the digital television 50 is determined by the sub CPU 28. The HDMI-CPU 24 and the main CPU 26 are started by the sub CPU 28 when the determination result relating to the wake-up command is updated to YES. The process according to the command issued thereafter from the digital television 50 is executed by the HDMI-CPU 24 and the main CPU 26.

In this way, the process according to the start command is executed by the sub CPU 28, and the process according to the command issued after the start command is executed by the HDMI-CPU 24 and the main CPU 26. Thereby, it becomes possible to alleviate the power consumption of the HDMI-CPU 24 and the main CPU 26 (in particular, the power consumption of the HDMI-CPU 24).

Figure 9:
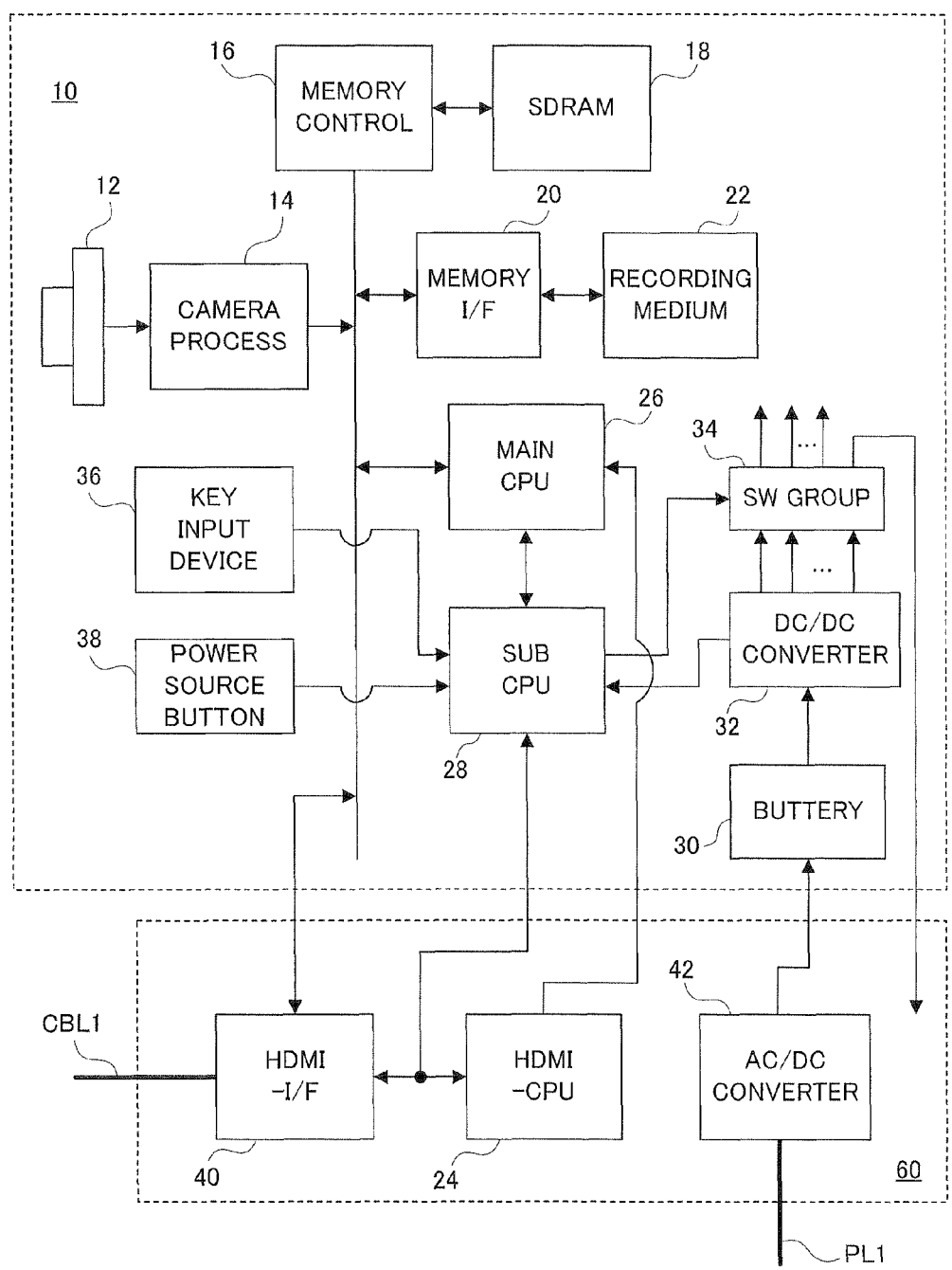
FIG. 9 is a block diagram showing a configuration of another embodiment of the present invention.

It is noted that in this embodiment, the HDMI-I/F 40 and the HDMI-CPU 24 are arranged in the digital camera 10. However, the HDMI-I/F 40 and the HDMI-CPU 24 may be optionally arranged in a recharging-use cradle 60 accompanying the digital camera 10, as shown in FIG. 9.

Figure 10:
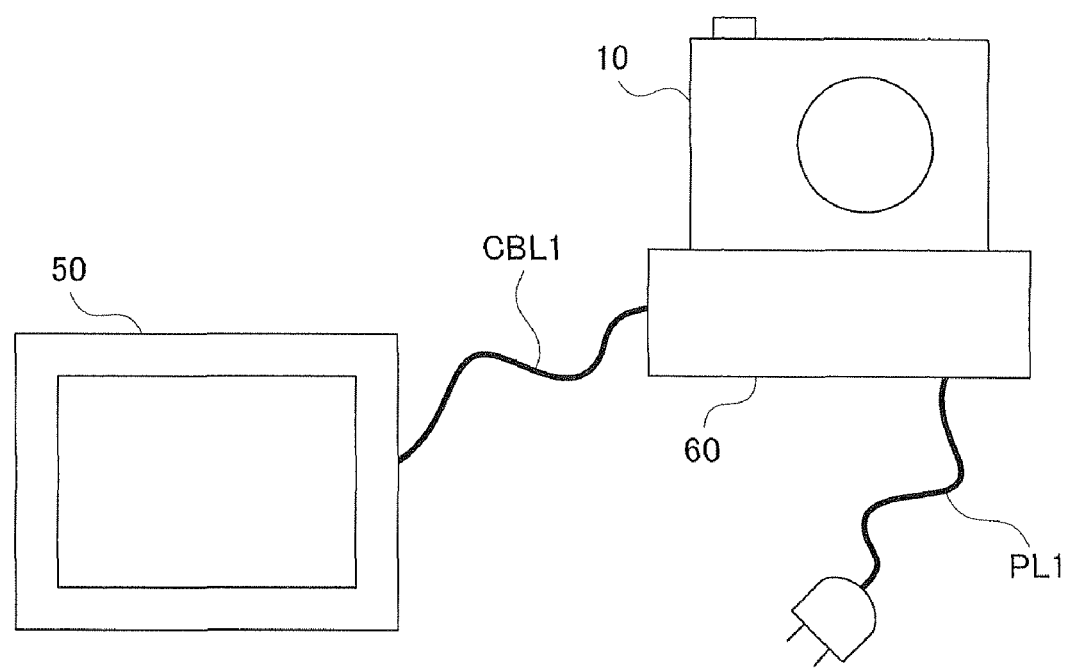
FIG. 10 is an illustrative view showing one example of a connection relation between the embodiment in FIG. 9 and the digital television.

In this case, the AC/DC converter 42 originally arranged in the cradle 60 converts a commercially available alternate power source supplied via a plug PL1, to a direct power source. The battery 30 is recharged by the direct power source converted by the AC/DC converter 42. Also, the HDMI-CPU 24 is started by the direct-current voltage that has undergone the SW group 34. Moreover, the digital television 50 and the digital camera 10 are connected to each other via the cradle 60, as shown in FIG. 10.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A command processing apparatus, comprising:
 a first processor started irrespective of a state of a main power source; and
 a second processor started when the main power source is in an on state while stopped when the main power source is in an off state,
wherein
 said first processor is provided with
  a first determiner which repeatedly determines whether or not a start command is issued by an external device when the main power source is in the off state,
  a first changer which changes the state of the main power source to the on state when a determination result of said first determiner is updated from a negative result to a positive result, and
  a second changer which changes the state of the main power source to the off state in response to a power-source off instruction issued by an issuer;
 the second processor is provided with a command processor which executes a process according to a command issued by the external device;
 and
 the command processor includes the issuer which issues the power-source off instruction toward said first processor when the command is a stop command.

2. A command processing apparatus according to claim 1, wherein said first determiner includes a first decoder which decodes data transmitted from the external device in the off state according to a predetermined format, and a first command determiner which determines whether or not the data decoded by the first decoder is equivalent to the start command.

3. A command processing apparatus according to claim 1, wherein said command processor includes a second determiner which determines whether or not the command is issued by the external device, and a command process executer which executes a process according to the command when a determination result of said second determiner is updated from a negative result to a positive result.

4. A command processing apparatus according to claim 3, wherein said second determiner includes a second decoder which decodes data transmitted from the external device according to the predetermined format, and a second command determiner which determines whether or not the data decoded by the said second decoder is equivalent to the command.

5. A command processing apparatus according to claim 3, wherein said second processor is separated into a first CPU which assumes a role of said second determiner and a second CPU which assumes a role of said command process executer, and said first CPU is arranged in a main-body apparatus while the second CPU is arranged in a cradle.

6. A command processing apparatus according to claim 1, wherein said first processor further includes a third changer which changes the state of the main power source to the on state in response to the power-source on manipulation, and a fourth changer which changes the state of the main power source to the off state in response to the power-source off manipulation.

7. A command processing apparatus according to claim 1, further comprising a manipulation key, wherein said first processor is further provided with a transferer which transfers state information indicating a state of the manipulation key to said second processor when the main power source is in the on state, and said second processor is further provided with a key processor which executes a process according to the state information transferred by said transferer.

8. A command processing apparatus, comprising:
a first processor which is started irrespective of a state of a main power source;
a second processor which is started when the main power source is in an on state while stopped when the main power source is in an off state;
a receiver which receives a plurality of commands including a start command from an external device; and
a key input device which is connected to said first processor, wherein
said first processor includes a first changer which changes the state of the main power source to the on state in response to the start command received by said receiver when the main power source is in the off state, and a transferor which transfers state information indicative of an operation state of said key input device to said second processor when the main power source is in the on state, and
said second processor includes a first executer which executes a process in accordance with the command received by said receiver, and a second executer which executes a process in accordance with the state information transferred by said transferor.

9. A command processing apparatus according to claim 8, further comprising a power source button which is connected to said first processor, wherein said first processor further includes a second changer which changes the state of the main power source to the on state in response to a power source on operation by said power source button.

10. A command processing apparatus according to claim 8, wherein said first executer includes an issuer which issues a power source off instruction to said first processor when the command is a stop command, and said first processor further includes a second changer which changes the state of the main power source to the off state in response to the power source off instruction issued by said issuer.

* * * * *